United States Patent
Miao et al.

(10) Patent No.: US 8,726,327 B2
(45) Date of Patent: May 13, 2014

(54) SYSTEM AND METHOD FOR PEER-TO-PEER LIVE STREAMING

(75) Inventors: Yu-Ben Miao, Tainan County (TW); Ce-Kuen Shieh, Tainan (TW); Tzu-Chi Huang, Tainan (TW); Chiuan-Yu Wei, Hsinchu County (TW); Ben-Wen Luo, Tainan (TW); Ping-Chun Tseng, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 208 days.

(21) Appl. No.: 13/109,199

(22) Filed: May 17, 2011

(65) Prior Publication Data
US 2012/0117605 A1 May 10, 2012

(30) Foreign Application Priority Data
Nov. 4, 2010 (TW) .............................. 99137965 A

(51) Int. Cl.
H04N 7/173 (2011.01)
H04N 21/24 (2011.01)
H04N 21/2387 (2011.01)
H04N 21/2383 (2011.01)
H04N 21/2365 (2011.01)
H04N 21/63 (2011.01)
H04N 21/4788 (2011.01)

(52) U.S. Cl.
CPC ........... *H04N 21/24* (2013.01); *H04N 21/2387* (2013.01); *H04N 21/2383* (2013.01); *H04N 21/2365* (2013.01); *H04N 21/63* (2013.01); *H04N 21/4788* (2013.01)
USPC ............ 725/115; 725/116; 725/117; 725/120

(58) Field of Classification Search
CPC .............. H04N 21/24; H04N 21/2387; H04N 21/2383; H04N 21/2365; H04N 21/63; H04N 21/4788
USPC ................................... 725/115, 116, 117, 120
See application file for complete search history.

(56) References Cited

U.S. PATENT DOCUMENTS

| | | | |
|---|---|---|---|
| 7,093,004 B2 | 8/2006 | Bernardin et al. | |
| 7,522,774 B2 | 4/2009 | Ramasastry et al. | |

(Continued)

FOREIGN PATENT DOCUMENTS

| | | |
|---|---|---|
| TW | 200833105 A | 8/2008 |
| TW | 200925913 A | 6/2009 |

(Continued)

OTHER PUBLICATIONS

Yiu, W.-P.Ken et al., "VMesh: Distributed Segment Storage for Peer-to-Peer Interactive Video Streaming", IEEE Journal on Selected Areas in Communications, vol. 25, No. 9, pp. 1717-1731, Dec. 2007.

(Continued)

*Primary Examiner* — Pankaj Kumar
*Assistant Examiner* — Sahar Baig
(74) *Attorney, Agent, or Firm* — Rabin & Berdo, P.C.

(57) ABSTRACT

A P2P network has a content provider and a plurality of peers viewing the same video streaming channel. Each peer has a P2P live streaming system. In an exemplary system, a token manager module manages at least a token sent by the plurality of peer nodes, notifies a recording manager module to publish recorded media stream content, and to record media stream data. The recording manager module, according to the notification, manages a corresponding buffer for each peer node itself, records the media stream content into the corresponding buffer and publishes the recorded media stream content information to the P2P network. A P2P module handles the P2P messages and maintains the P2P network topology for the plurality of peer nodes.

10 Claims, 18 Drawing Sheets

(56) References Cited

U.S. PATENT DOCUMENTS

| | | | |
|---|---|---|---|
| 7,536,704 | B2 | 5/2009 | Pierre et al. |
| 7,624,337 | B2 | 11/2009 | Sull et al. |
| 7,664,109 | B2 | 2/2010 | Li |
| 7,685,083 | B2 | 3/2010 | Fairweather |
| 7,752,327 | B2 * | 7/2010 | Li .................. 709/231 |
| 8,041,942 | B2 * | 10/2011 | Narayanan et al. ........ 713/156 |
| 8,196,186 | B2 * | 6/2012 | Mityagin et al. .................. 726/4 |
| 2005/0080858 | A1 * | 4/2005 | Pessach ...................... 709/206 |
| 2006/0053209 | A1 | 3/2006 | Li |
| 2007/0130597 | A1 | 6/2007 | Parker et al. |
| 2008/0133767 | A1 | 6/2008 | Birrer et al. |
| 2008/0208976 | A1 | 8/2008 | Chapalamadugu et al. |
| 2009/0064188 | A1 * | 3/2009 | Ospalik et al. .............. 719/318 |
| 2009/0116640 | A1 | 5/2009 | Noh et al. |
| 2009/0119734 | A1 | 5/2009 | Deshpande et al. |
| 2009/0300673 | A1 * | 12/2009 | Bachet et al. ................ 725/31 |
| 2010/0011103 | A1 * | 1/2010 | Luzzatti et al. .............. 709/226 |
| 2011/0047566 | A1 * | 2/2011 | Matuchniak et al. ........... 725/29 |
| 2011/0225617 | A1 * | 9/2011 | Rakib .......................... 725/109 |

FOREIGN PATENT DOCUMENTS

| | | |
|---|---|---|
| TW | 200943957 A | 10/2009 |
| TW | 200951832 A | 12/2009 |
| TW | 201023647 A | 6/2010 |

OTHER PUBLICATIONS

Noh, J. et al., "Pseudo-DHT: Distributed Search Algorithm for P2P Video Streaming", Tenth IEEE International Symposium on Multimedia 2008, pp. 348-355.

Zhengye Liu et al., "Substream Trading: Towards an open P2P live streaming systems", IEEE International Conference on Network Protocols 2008, pp. 94-103.

Yuan He et al., "VOVO: VCR-Oriented Video-on-Demand in Large-Scale Peer-to-Peer Networks", IEEE Transactions on Parallel and Distributed Systems, vol. 20, No. 4, pp. 528-539, Apr. 2009.

Yun-Shuai Yu et al., "P2PVR: A Networked VCR Service for Live Multimedia Streaming", International Symposium on Computer Network and Multimedia Technology, 2009.

Taiwan Patent Office, Office Action, Patent Application Serial No. TW099137965, Jul. 19, 2013, Taiwan.

* cited by examiner

SYSTEM AND METHOD FOR PEER-TO-PEER LIVE STREAMING

TECHNICAL FIELD

The present disclosure generally relates to a system and method for peer-to-peer (P2P) live streaming.

BACKGROUND

As the network bandwidth increases, the video streaming quality also improves, thereby increasing the bandwidth usage of media servers. To reduce the bandwidth load on the media servers, many software developments start to focus on P2P technology, such as, BitTorrent (BT)-like or mesh network.

For example, an U.S. patent document on instant replay and time-shifted playback provides a multimedia content delivery server to store all the live video streams to provide instant replay, and just as time-shifted, the previous video may be played back any time. Through a central control mechanism, the terminal end transmits the time-shifted point via the set top box to the server of the central control mechanism, and then the server responds with related information or data. When the number of users increases at the terminal end, more servers and more bandwidth are often required to maintain service quality.

Another U.S. patent document disclosed a technology of display of content and automatic pause and resume of playback. The technology is applicable to client device and/or ahead-end, or network operator. The technology is based on type of event, originator, and type of current display to assign priority to event for providing variable response levels. The technology requires maintenance of central control mechanism, which may lead to system bottleneck.

Yet another U.S. patent document disclosed a real-time multicast peer to peer video streaming platform. As shown in FIG. 1, system 100 provides a distributed storing live stream. Content provider 102 uses a computer connected to a public network 104 and wants the chunks of content stored in the cache can be distributed to the nearby peers 108-114. The content may be, such as, from a camera 106 or other data source. Content provider 102 and nearby peers 108-114 may execute on respective computer a software or hardware streaming agent 116 to facilitate the distribution of the chunks of content to other peers. This architecture requires a server for capturing or storing the data of the program. If the program is live, the server may suffer the insufficient data space problem. On the other hand, the higher the number of the audience is, the server may suffer the insufficient bandwidth problem, may lead to delayed or even lost frames. This technique did not provide peer to peer load-balancing mechanism.

Yet another U.S patent document disclosed a scalable media distributed streaming technology. In coupled P2P networks, peer streamer may provide a receiver-driven P2P video streaming, wherein peer lists can be searched like distributed hash table (DHT). This technology did not describe the use of load-balancing mechanism through DHT.

Yet another U.S patent document disclosed a distributed cache algorithm and system for time-shifted, and live, peer-to-peer video streaming. As shown in FIG. 2, video source is connected via a network link 221 to a packet transmission network 220. Client/peer 230 is also connected via respective network link to packet transmission network 220. Distributed cache system 200 shares the video streaming via the distributed cache among the peers, where each client/peer j of client/peer 230, $1 \leq j \leq N$, needs to register the availability of own information content to a search server 260. The stream source search also needs to communicate with search server 260, and uses a fixed bit rate stream via the video cache policy of initial playback position (IPP) and live-stream position (LSP) to obtain a better search efficiency. This method still may need to maintain one or more search servers, and IPP or LSP only divides video streaming into two major categories without coordination mechanism among peers to achieve load-balance.

SUMMARY

The exemplary embodiments disclose a system and method for peer to peer (P2P) live streaming.

A disclosed exemplary embodiment relates to a system for P2P live streaming, applicable to a P2P network. The P2P network has a content provider and a plurality of peers viewing the same video streaming channel. Each peer has a P2P live streaming system. The system comprises a token manager module, a recording publisher module, a recording manager module and a P2P module. The token manager module manages at least a token sent by the plurality of peers, notifies a recording manager module to record video stream data and publish recorded video stream content. The recording manager module, according to the notification, records video stream data and publishes the recorded video stream content information to the P2P network. The recording manager module manages a corresponding buffer for each peer itself, records the video stream content into the corresponding buffer according to the token manager module's command. The P2P module handles the P2P messages and maintains the P2P network topology for the plurality of peers.

Another disclosed exemplary embodiment relates to a method for P2P live streaming, applicable to a live streaming system in a P2P network. The method comprises: forming a P2P network of a plurality of peers viewing the same live streaming channel; when a peer of the plurality of peers viewing a live stream, a token being propagated, the token having time information recording the partial data of the live stream; the peer receiving the token, according to the time information on the token, recording the data of a time slot designated by the live stream in a storage space, and publishing to the P2P network using the time slot as a key; and when any peer wanting to view a time point in the live stream, the time point being used as the key to obtain the address information of at least a peer owning the live stream data of that time point from the P2P network, and downloading the stream data of a time slot corresponding to the time point from a peer.

The present disclosure will become better understood from a careful reading of a detailed description provided herein below with appropriate reference to the accompanying drawings.

DETAILED DESCRIPTION OF THE EXEMPLARY EMBODIMENTS

The disclosure discloses embodiments of mechanism for recording live streaming content in a P2P network. The mechanism not only considers the bandwidth load balance, but also provides a distributed management method to reduce the resource consumption in the P2P network, such as, the purchase of servers or storage space.

Figure 1:
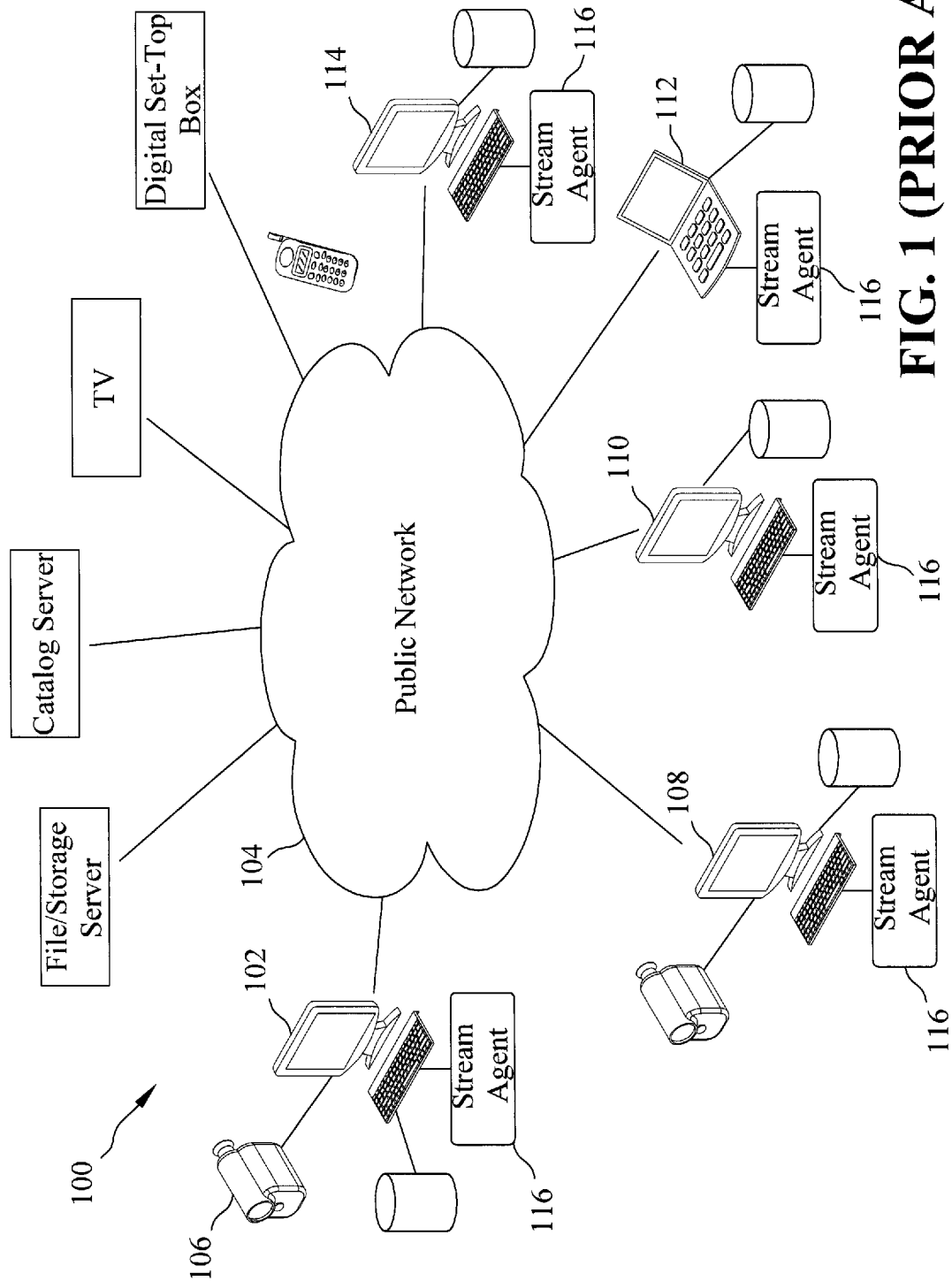
FIG. 1 shows an exemplary schematic view of a live multicast P2P video streaming platform.
Figure 2:
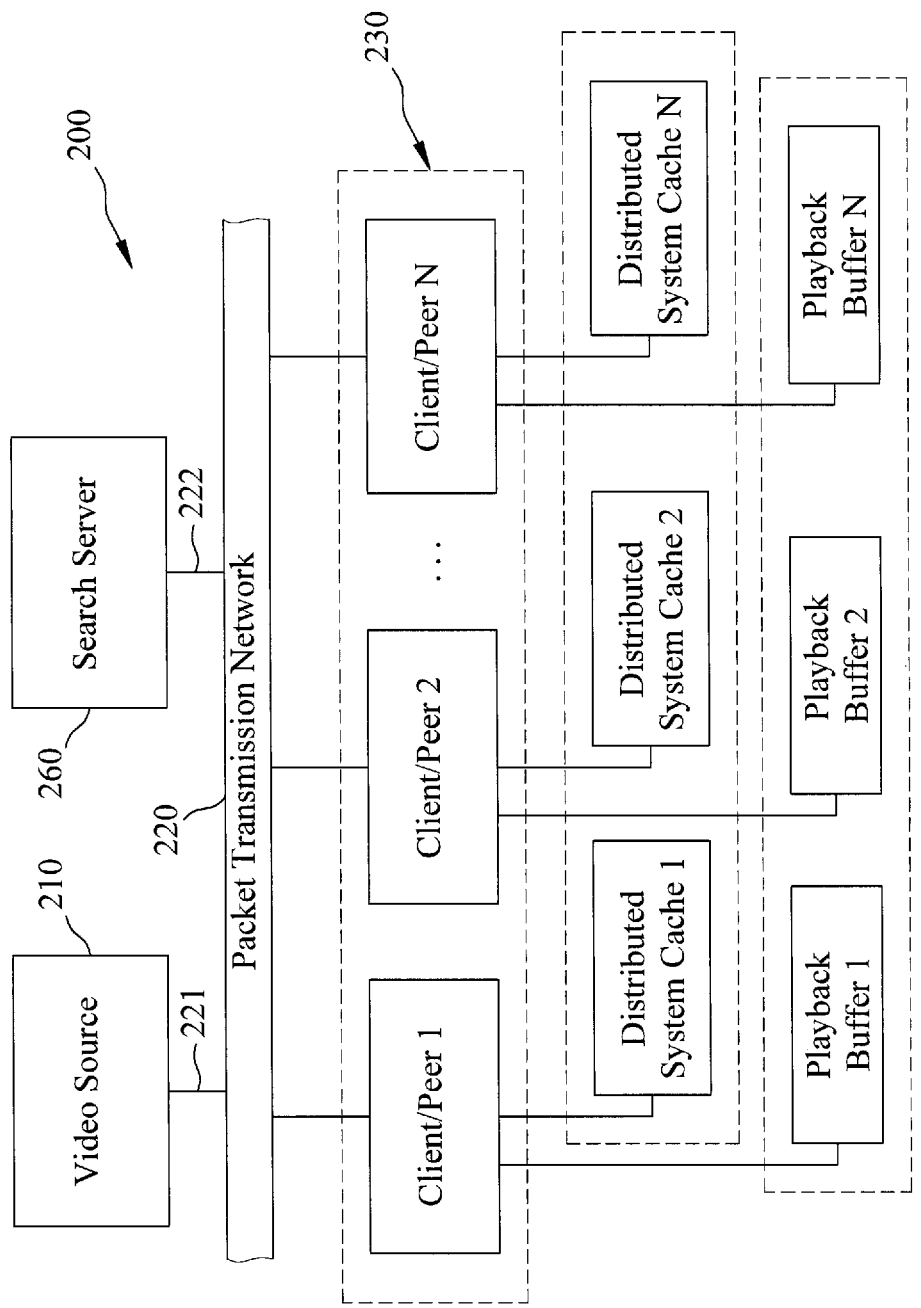
FIG. 2 shows an exemplary schematic view of a distributed cache method for playback and live P2P video stream.
Figure 3:
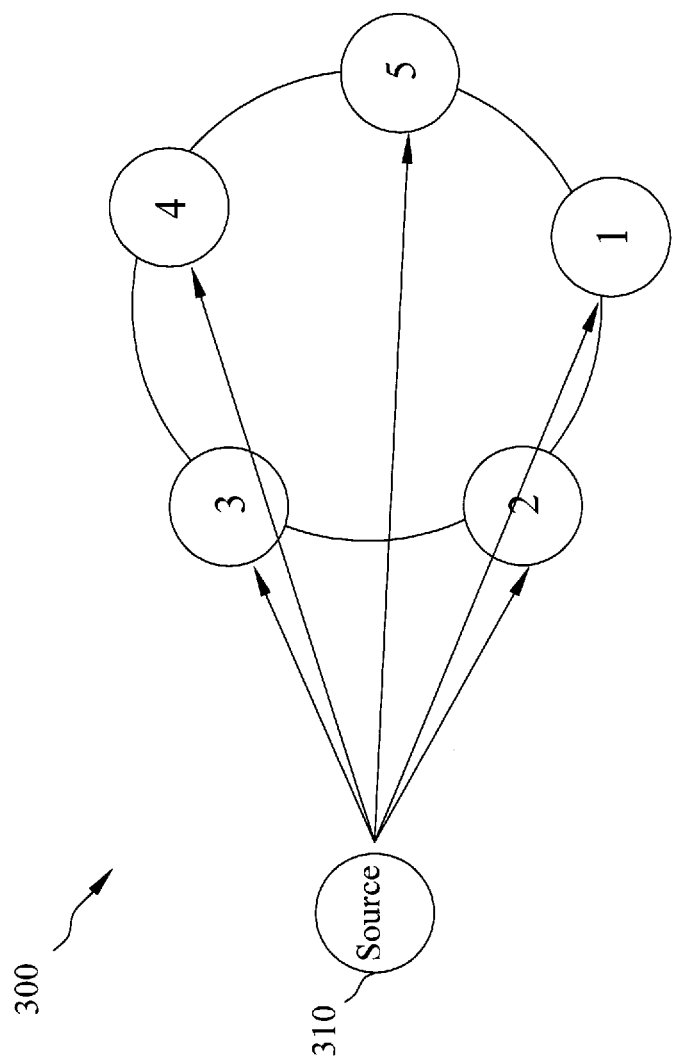
FIG. 3 shows an exemplary schematic view of a DHT-network-based video streaming, consistent with certain disclosed embodiments.

FIG. 3 shows an exemplary schematic view of a DHT-network-based video streaming, consistent with certain disclosed embodiments. In FIG. 3, five peers, marked from 1-5, use the same hash function to join in the same live streaming channel to form a DHT-network 300, wherein the arrow indicates the video streaming. The media is streamed from a source 310 to each peer. The topology of DHT-network 300 may be ring, linear, tree or multi-dimensional. The exemplar is of a ring topology. Each peer has own node ID, and has a predecessor node and a successor node. Take peer 2 as an example, the predecessor node is peer 1 and the successor node is peer 3.

In an exemplar, all the peers viewing the same live streaming channel are formed into a P2P network for live stream sharing and providing live stream playback. When a peer is viewing a live stream, a token is propagated. The peer receiving the token records the data of a designated time slot in the live stream to a buffer of a storage device. After storing, the time slot is used as the key to publish to the P2P network. When a peer is to execute stream playback, such as, viewing a time point of a live stream, the time point is used as the key to obtain the peer address information owning the data of that time point from the P2P network, and then downloads the content of the stream data in the recorded slot corresponding to that time point from the peer.

The P2P network includes a content provider and a plurality of peers viewing the same stream channel. Each peer of the plurality of peers has a P2P live streaming system. For token processing, each peer includes the same management module, such as, adopting the same token manager module. In this manner, the system structure is simplified without additional modules to support token management. The token manager module instructs a recording manager module of the system when to record the video stream content. Once the recording is complete, the recording manager module will publish the recorded video stream content. The recording manager module of the system may publish the message of the recorded video stream content via a P2P module to the P2P network so that the recording retriever module of the P2P network may read the video stream content. The propagated token will also circulate among peers.

As aforementioned, the video stream content will be stored to a buffer of a storage device, such as, RAM, disk, or other storage devices. In one embodiment, the recording manager module of the system also has the capability to manage the buffer recording the video stream content.

Figure 4:
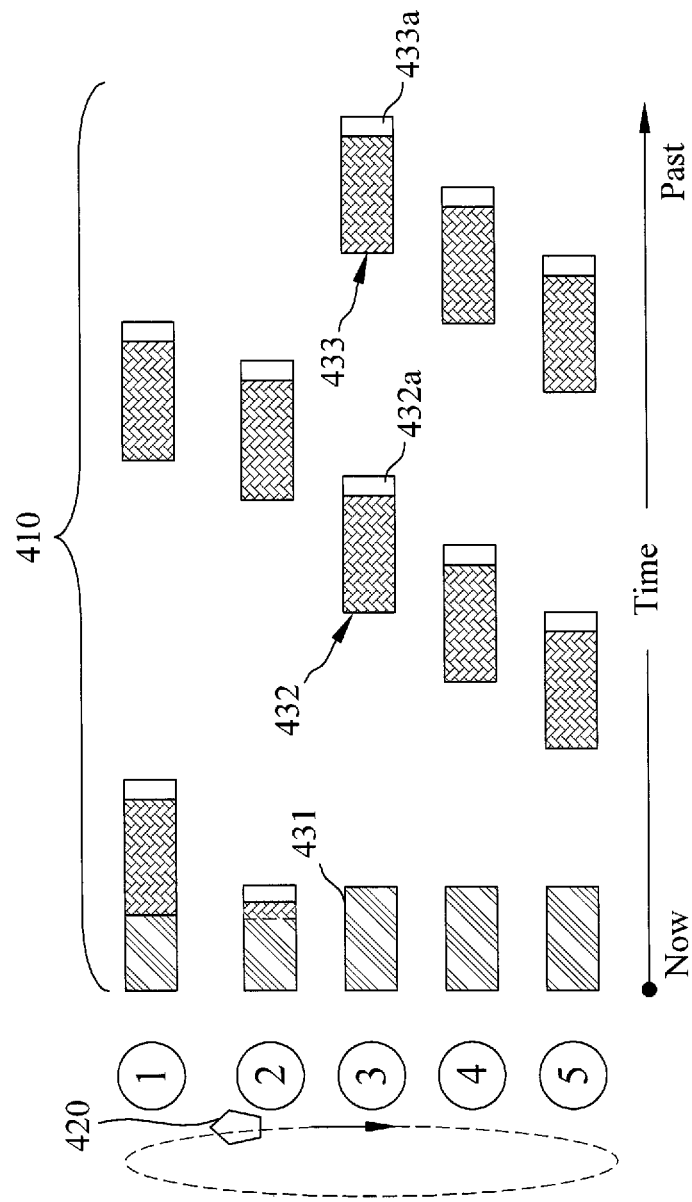
FIG. 4 shows an exemplary schematic view of buffer management using network topology in FIG. 3 as exemplar, consistent with certain disclosed embodiments.

FIG. 4 shows an exemplary schematic view of buffer management using network topology in FIG. 3 as exemplar, consistent with certain disclosed embodiments. In FIG. 4, in DHT network 300, peers 1 to 5 view the same channel. Assume that peer 2 is viewing a live stream and propagates a token 420 to peer 3. Token 420 will circulate among all peers. Each peer keeps own buffer 410. In the disclosed embodiment, the buffer 410 size is adjustable, such as, according to the storage capacity of the peer. The recording manager module of the system uses time as a unit to divide each peer's buffer 410 into a plurality of chunks to record the video stream data, including live video stream data and past stored video stream data, wherein each chunk is referred to as a recording slot. In buffer 410, each recorded slot with recorded video stream data has a chunk header for storing the channel information and time information of the recorded video stream content. Take peer 3 as example, wherein recorded slot 431 records the live stream data, and recorded slots 432, 433 record past recorded video stream data, having chunk headers 432*a*, 433*a*, respectively. Header 432*a*, for example, stores the time information of the past recorded video stream.

Because each stream corresponds to a time code, the hash value of the recorded slot may be computed using the time code and the channel code of the stream as the key, and the hash value is stored in DHT 300. To search DHT network 300, the time code of the stream is used as the ID and channel code to compute the hash value.

The recording manager module of the system may use the redundant slots for node failure recovery. The token information may include the start time and the end time of the partial data of the live stream recorded by the precedent node of a peer. The minimum unit size of the recorded stream data may be a fixed interval, such as, 5 seconds. The recording manager module may use the channel information and the time information in the chunk header of a recorded slot as the key, and determine via DHT which peer stores a peer list recording the video stream data of the recorded slot.

Figure 5:
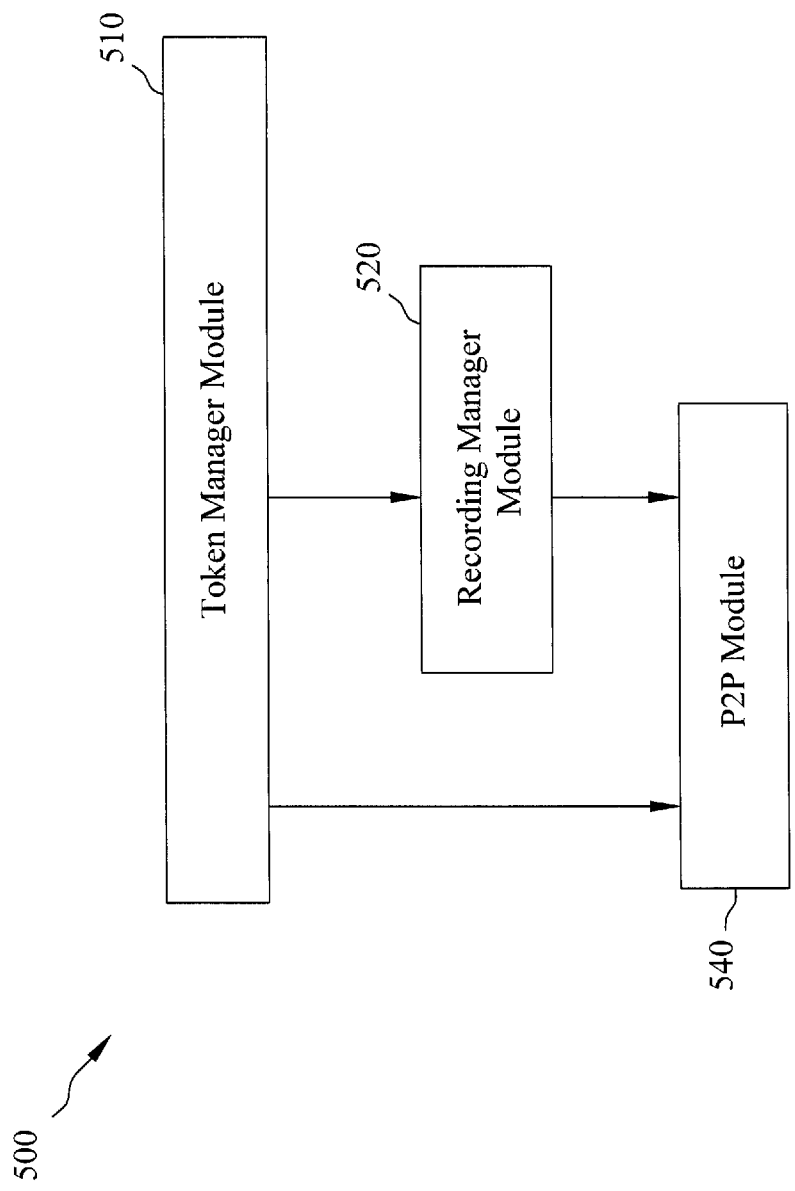
FIG. 5 shows an exemplary schematic view of the P2P live streaming system, consistent with certain disclosed embodiments.

As aforementioned, each of all the peers viewing the same streaming channel may have the same P2P live streaming system. As shown in FIG. 5, a P2P live streaming system 500 may comprise a token manager module 510, a recording manager module 520, and a P2P module 540. Token manager module 510 manages at least a token, notifies recording manager module 520 to publish recorded video stream content, and commands recording manager module 520 to record video stream data. Recording manager module 520, according to the notification from token manager module 510, publishes the recorded video stream content information via P2P module 540 to the P2P network formed by the plurality of peers. Recording manager module 520 manages a corresponding buffer for each peer itself, records the video stream content into the corresponding buffer according to instruction from token manager module 510. P2P module 540 handles the P2P messages and maintains the P2P network topology for the plurality of peers.

Figure 6:
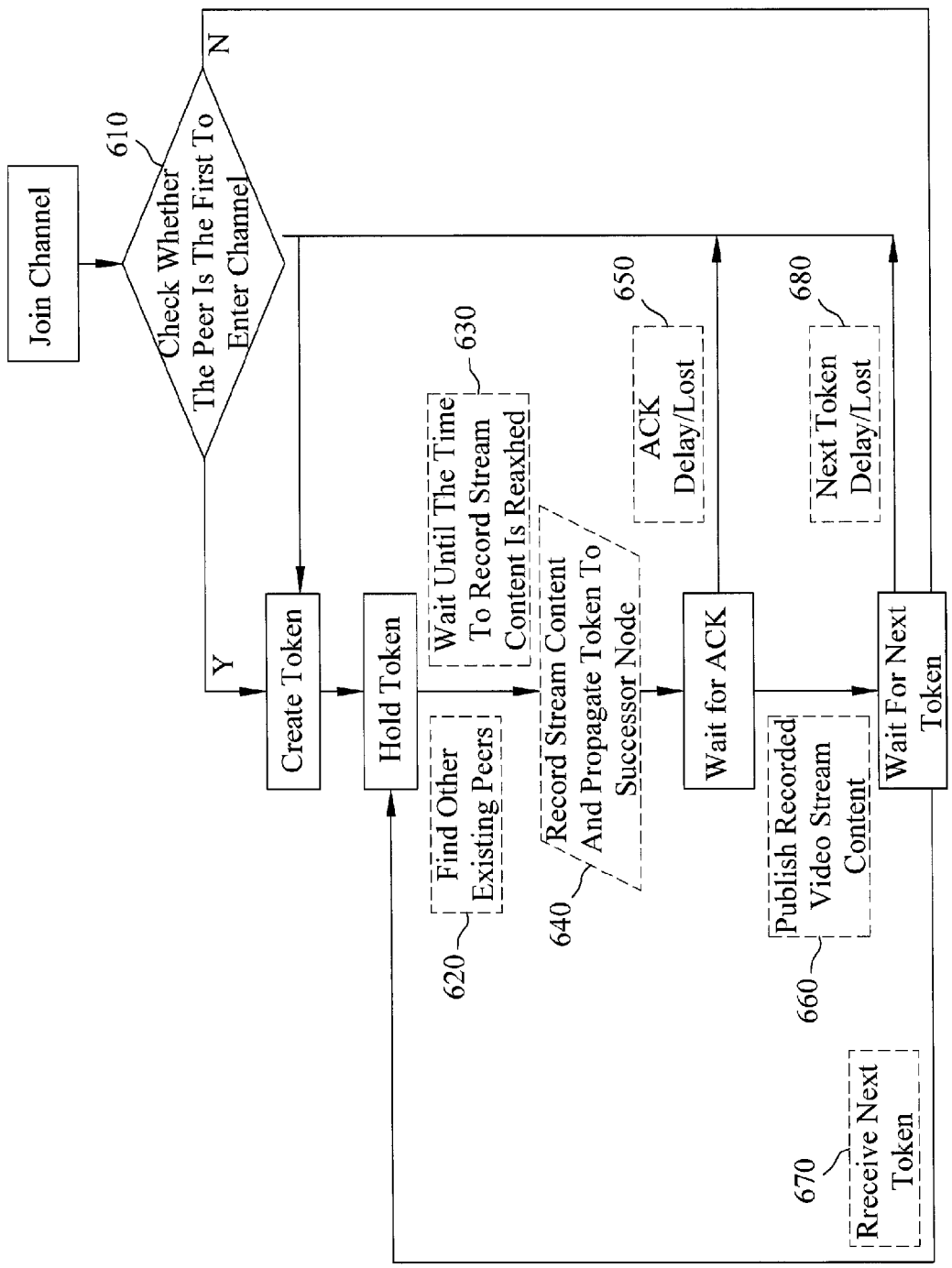
FIG. 6 shows an exemplary finite state machine illustrating the processing flow of token manager module for processing token propagation among a plurality of peers, consistent with certain disclosed embodiments.

FIG. 6 shows an exemplary finite state machine illustrating the processing flow of token manager module 510 for processing token propagation among a plurality of peers, consistent with certain disclosed embodiments. The finite state machine of FIG. 6 includes five states, i.e., join channel, create token, hold token, wait for ACK and wait for next token. When a peer joins a live stream channel, the peer enters the "join channel" state. Token manager module 510 will check whether the peer is the first to enter the channel, marked as 610. If so, the peer creates a token, and enters the "create token" state; otherwise, the peer enters the "wait for next token" state.

After creating token, the peer enters the "hold token" state. After finding other existent peers, marked as 620, and waiting till the time of recorded stream content, marked as 630, the peer records the stream content and propagate the token to the next peer, marked as 640, and then the peer enters "wait for ACK" state. Before receiving the ACK from the successor node, if the ACK is delayed or lost, marked as 650, the peer enters "create token". In other words, the peer must repeat the earlier process to propagate a new token again. Hence, the token manager module may adopt a finite state machine to describe the processing flow of token propagation among the peers.

Figure 7:
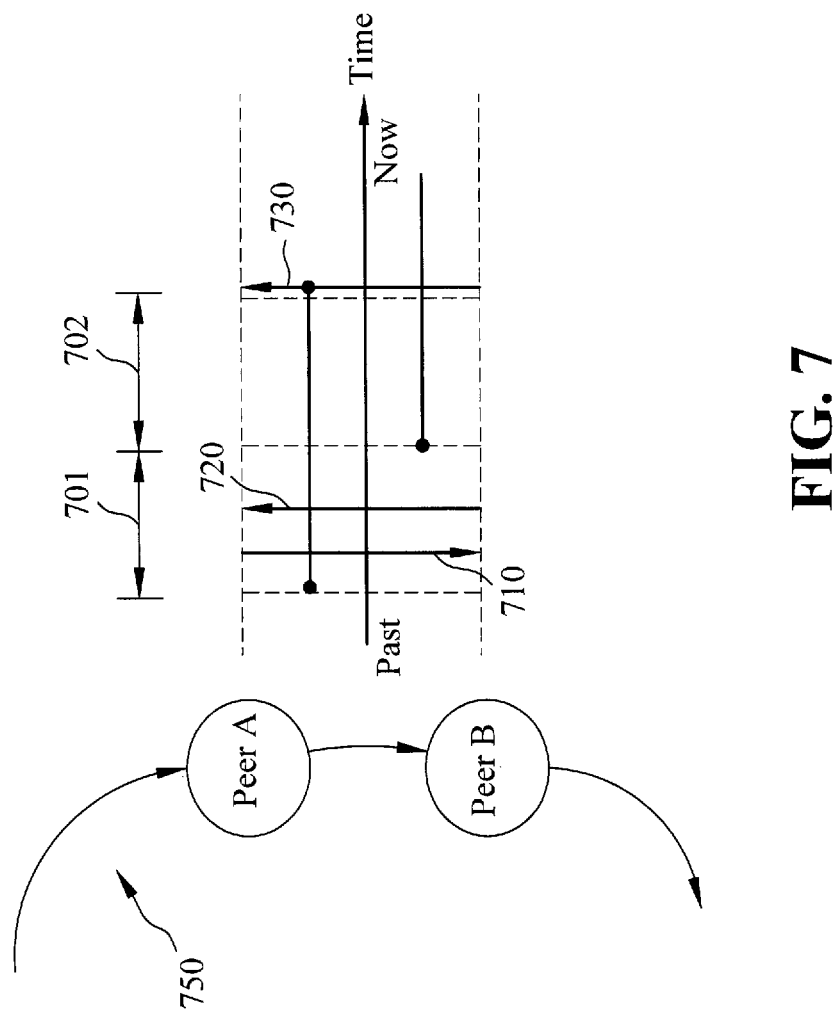
FIG. 7 shows an exemplary schematic view of a handshake protocol between two peers during propagating token, consistent with certain disclosed embodiments.

Assume that the peer is peer A, and the successor node is peer B. Please also refer to the schematic view of the handshake protocol between two peers of token delivery path in FIG. 7. In the exemplary embodiment of FIG. 7, peer A propagates the token to peer B during time slot 701, marked by arrow 710. After peer B receives the token, peer B replies to peer A with an ACK to acknowledge the reception of the token during time slot 701, marked by arrow 720. After peer B records stream content, peer B replies to peer A for completing recording, marked as arrow 730.

After peer A receives the completing recording reply from peer B, token manager module 510 notifies peer A to publish the message of recorded video stream content. As shown in FIG. 6, peer A stops recording video stream content, and then publishes the message of recorded video stream content, marked as 660, and then peer A enters "wait for next token" state. After peer A receives the next token, marked as 670, peer A enters "hold token" state. Before receiving the next token, if the next token is delayed or lost, marked as 680, peer A enters "create token" state. In other words, peer A must repeat the earlier process.

Figure 8:
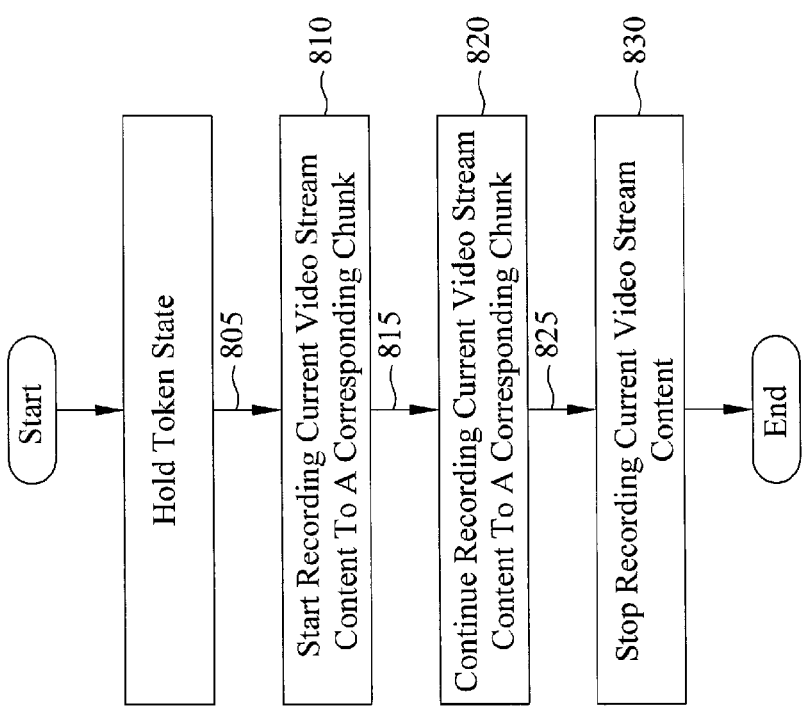
FIG. 8 shows an exemplary schematic view of a flow of recording video streaming content, consistent with certain disclosed embodiments.

Accordingly, FIG. 8 shows an exemplary schematic view of a flow of recording video streaming content, consistent with certain disclosed embodiments, wherein peer A and peer B are used as exemplar. Referring to FIG. 8, after peer A enters "hold token" state, once the time event of recording current video stream content occurs, marked by 805, for example, the time code corresponding to the current video stream is detected to reach the start time recorded on the held token, then peer A starts to record the current video stream content to a corresponding recorded slot, as shown in step 810. Also, peer propagates the token to successor node B, marked as 815. After peer A propagates the token, peer A continues recording the current video stream content to the corresponding recorded slot, as shown in step 820. After peer A receives the completing recording reply, marked as 825, from successor node B, peer A stops recording video stream content, as shown in step 830.

Before peer A propagates token to peer B, peer A modifies the time information in the token. After peer B receives the token propagated from peer A, similarly, peer B waits for the time event of recording current video stream content occurs, and starts to record the current video stream content to a corresponding recorded slot, and finally replies to peer A for completing recording. In this manner, the peers continue to record stream data until the successor node replies with completing recording. Therefore, the redundant slots are generated to reduce the possibility of losing video stream chunk as well as to enable node failure recovery.

In one embodiment, a distributed management method is used for token management. In other words, each peer of the same P2P network adopts the same token manager module 510 and manages the token in the same manner, including managing the addition, deletion, exception of the token. The exception processing, for example, token delayed or lost, is the failure recovery handling. The use of same token manager module simplifies the system architecture and eliminates the necessity of additional module to support the token management. Through the instruction of token manager module 510, the recording start time on the token will instruct recording manager module 520 of the system when to start recording the video stream content to the corresponding buffer of each peer. When the corresponding buffer is full, the old data in the buffer will be updated by new record of video stream content. Once the peer completes recording partial video stream content, the recording manager module begins the publishing processing. Token circulates among peers, and the information on the token carries the start time and end time of the partial video stream data recorded by the predecessor node. In other words, token manager module 510 uses the token propagation to regulate which of the peers of the same P2P network must record which chunks of partial video stream content.

Figure 9:
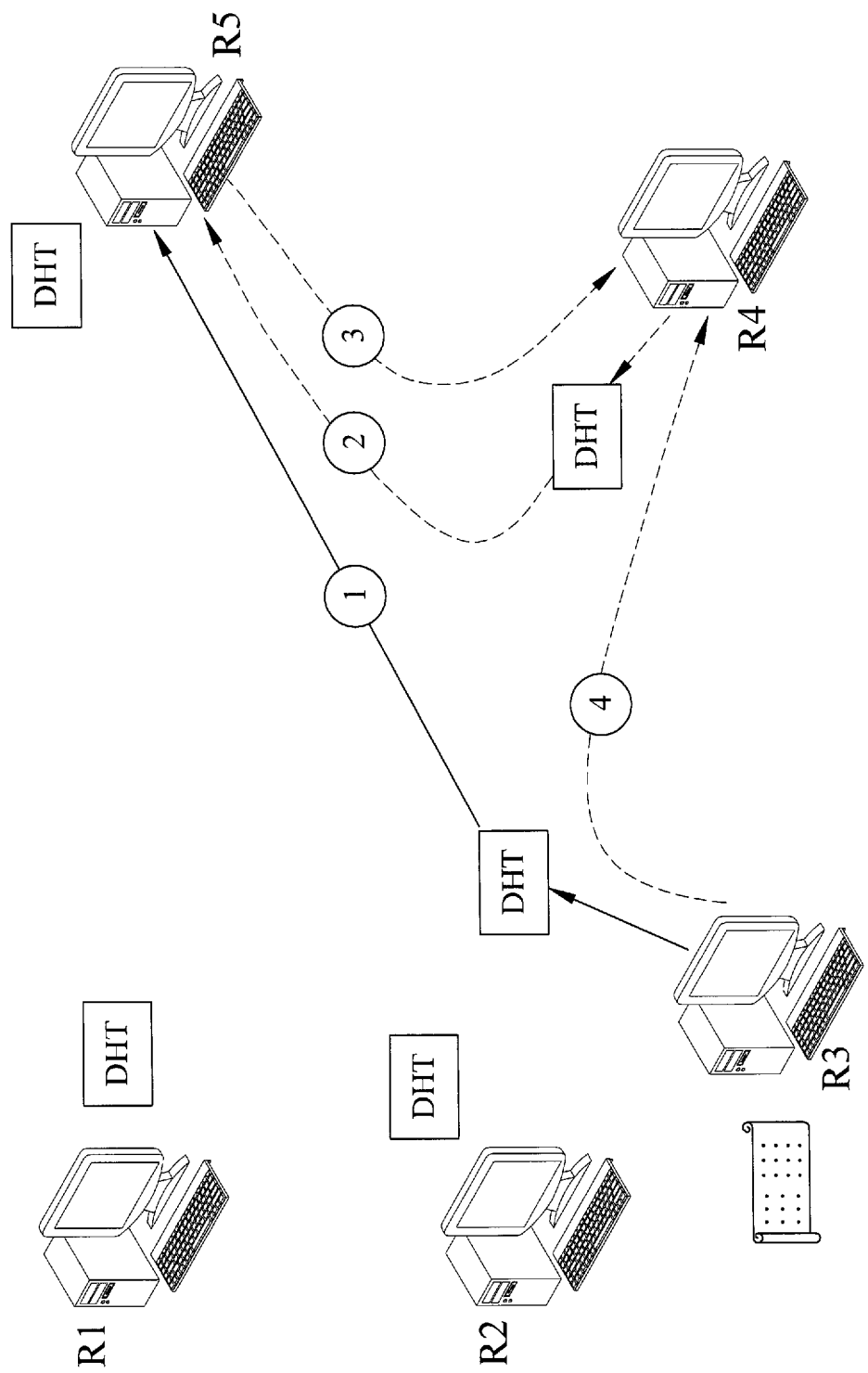
FIG. 9 shows an exemplary flow of a peer publishing/capturing peer list in a P2P network, consistent with certain disclosed embodiments.

FIG. 9 shows an exemplary flow of a peer publishing/capturing peer list in a P2P network, consistent with certain disclosed embodiments. In FIG. 9, there are fiver peers in a P2P network, marked as R1-R5. According to the order and the direction of circle mark 1 (the solid arrow), peer R3 first publishes the related information of own recorded video stream content to peer R5. Peer R5 records the IP address information of peer R3 and the start time and end time of the partial video stream data recorded by peer R3 to a peer list. The selection of Peer R5 may be determined by using a DHT and an algorithm adopted by P2P module 540. The DHT key value is determined by channel code and the time code. The time code is hidden in the video format, such as, MPEG II format. According to the order and the direction of circle marks 2, 3 (the dashed arrow), peer R4 also uses the same DHT to find the address and then uses P2P module to find the correct recording peer, i.e., peer R5. The peer list recorded by peer R5 is returned to peer R4, which issued the capturing request. According to the order and the direction of circle mark 4 (the dashed arrow), peer R4 finds the correct location of the stored video stream content based on the information in the returned peer list, i.e., peer R3. Then, peer R4 obtains the requested video stream content from peer R3.

Figure 10:
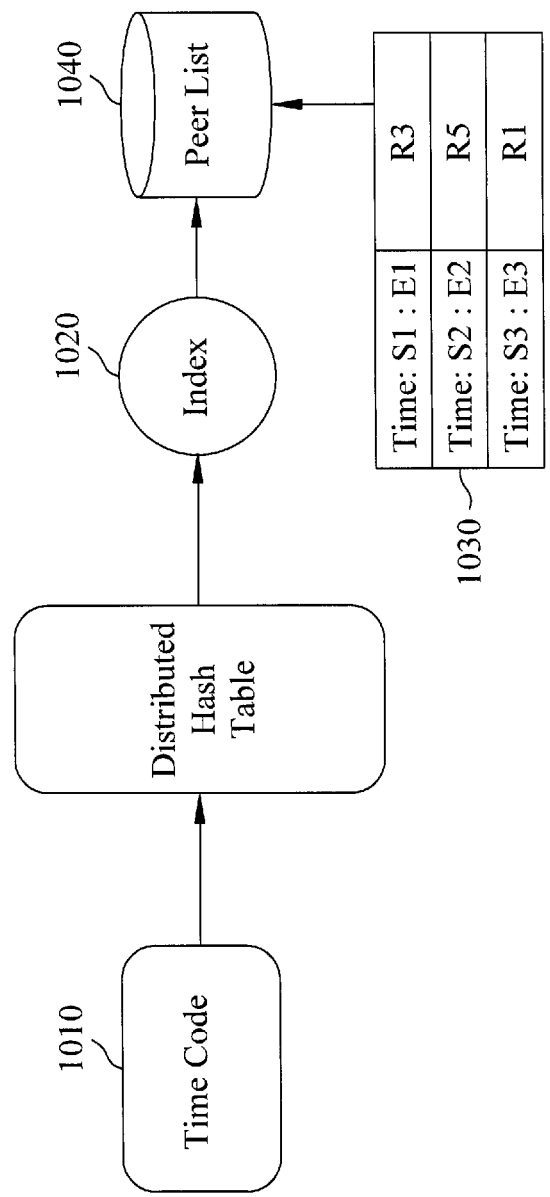
FIG. 10 shows an exemplary schematic view of publishing a video stream to a peer list or obtaining the peer storing the video stream from the peer list, consistent with certain disclosed embodiments.

FIG. 10 shows an exemplary schematic view of publishing a video stream to a peer list or obtaining the peer storing the video stream from the peer list, consistent with certain disclosed embodiments. Referring to FIG. 10, because each video stream correspond to a time code, a time code 1010 corresponding to a video stream is used as the input key value to a DHT. Through the DHT, an index 1020 is found. Index 1020 together with a mapping table such as mapping table 1030, is peer list 1040 for recording the video stream. From the content of peer list 1040, it may be known from which peers to obtain the requested video stream. Each entry of mapping table 1030 records information of start time and end time of the recorded video stream, and corresponding peer index, for example, an entry in mapping table 1030 records peer index R3, start time S1 and end time E1 of recorded video stream.

Figure 11:
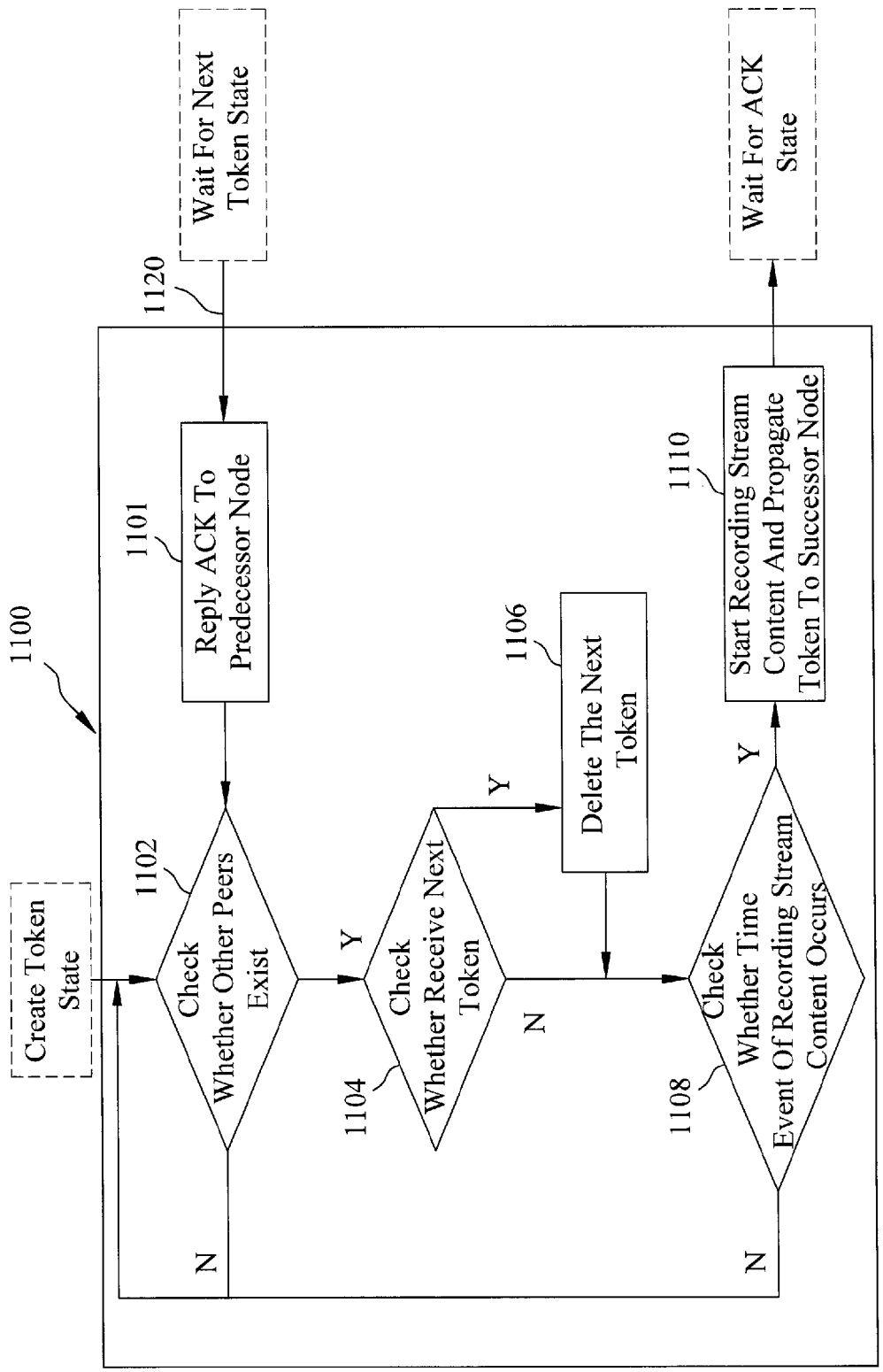
FIG. 11 shows an exemplary schematic view illustrating the hold token state of the finite state machine in FIG. 6, consistent with certain disclosed embodiments.
Figure 12:
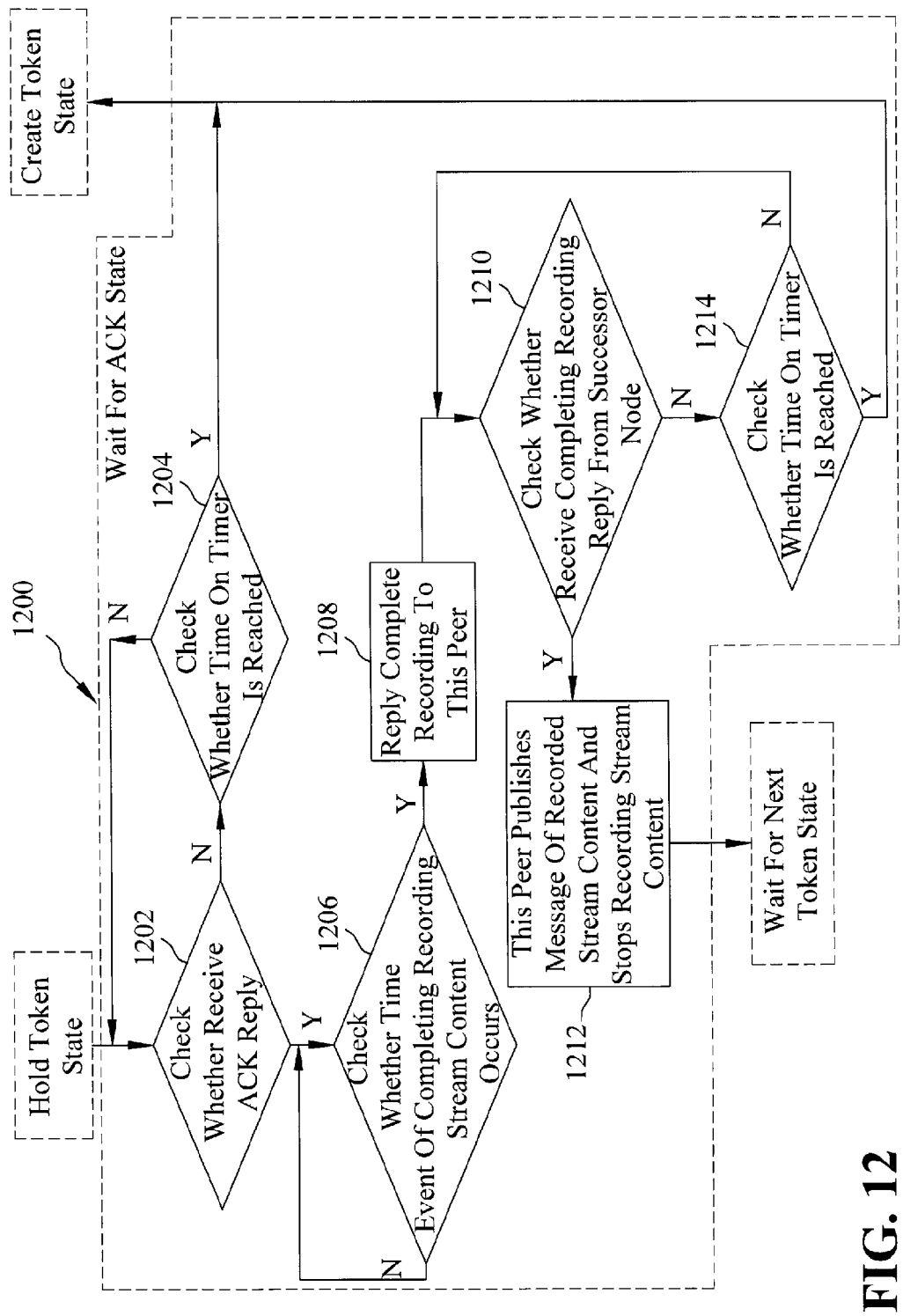
FIG. 12 shows an exemplary schematic view illustrating the wait for ACK state of the finite state machine in FIG. 6, consistent with certain disclosed embodiments.
Figure 13:
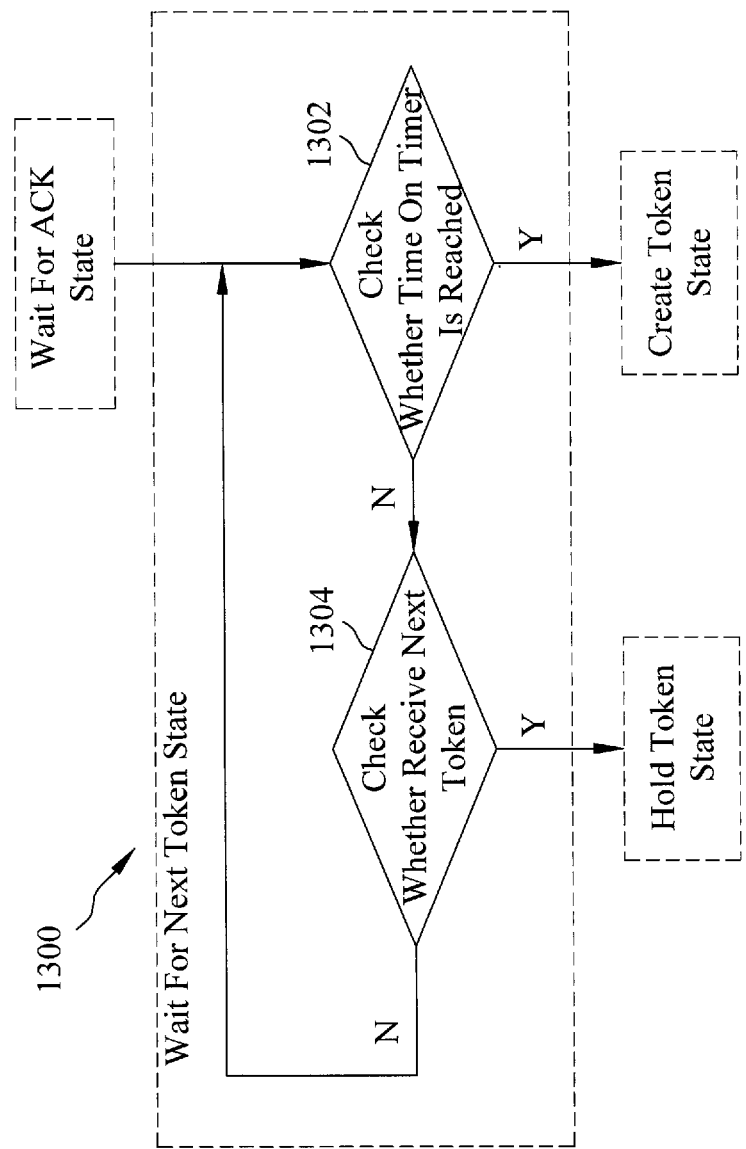
FIG. 13 shows an exemplary schematic view illustrating the wait next token state of the finite state machine in FIG. 6, consistent with certain disclosed embodiments.

FIG. 11, FIG. 12 and FIG. 13 respectively show the "hold token" state, "wait for ACK" state, and "wait for next token" state of the finite state machine of FIG. 6, consistent with certain disclosed embodiments.

Referring to FIG. 11, a peer may enter from "create token" state into "hold token" state 1100, or from "wait for next token" state into "hold token" state 1100. When a peer enters from "create token" state into "hold token" state 1100, while in "hold token" state 1100, the peer checks whether other peers exist, as shown in step 1102. When the peer enters to the "hold token" state 1100 from the "wait for next token" state, the peer will receive the next token (marked as 1120) before entering "hold token" state 1100, and reply to predecessor node with an ACK (step 1101) before executing step 1102.

When no other peers exist, step 1102 continues until other peers exist. Then, the peer checks whether the next token is received (step 1104). If so, the peer deletes the next token (step 1106) and checks whether the time event of the recorded stream content occurs (step 1108). When the peer does not receive the next token, the peer executes step 1008. When the time event of the recorded stream content has yet occurred, the peer returns to step 1102. When the time event of the recorded stream content occurs, the peer starts to record stream content and propagates the token to the successor node (step 1110), and then the peer enters the "wait for ACK" state.

Referring to FIG. 12, a peer may enter from "hold token" state to "wait for ACK" state 1200, and then from "wait for ACK" state 1200 to "wait for next token" state or to "create token" state. When the peer enters "wait for ACK" state 1200, the peer checks first whether an ACK is received (step 1202). If so, the peer checks whether the time event of the recorded stream content occurs (step 1206). If the ACK is not received, the peer checks whether the time on the timer is reached (step 1204). If not, continue step 1202 until the time on the timer is reached, and then the peer enters the "create token" state.

If the time event of the recorded stream content has yet occurred, the peer continues executing step 1206 until the time event of the recorded stream content occurs, and then replies completing recording to the predecessor node (step 1208). The peer checks whether a completing recording reply from successor node is received (step 1210). If received, the peer publishes the message of recorded video stream content, stops recording stream content (step 1212), and then enters "wait for next token" state. If the peer does not receive the completing recording reply from successor node, the peer checks whether the time on the timer is reached (step 1214). If so, the peer enters "create token" state; otherwise, the peer returns to step 1210.

Referring to FIG. 13, a peer may enter from "Wait for ACK" state to "wait for next token" state 1300, and then from "wait for next token" state 1300 to "hold token" state or to "create token" state. When the peer enters "wait for next token" state 1300, the peer checks first whether the time on the timer arrives (step 1302). If so, the peer enters the "create token" state; otherwise, the peer checks whether the next token is received (step 1304). If the next token is received, the peer enters the "hold token" state; otherwise, the peer returns to step 1302.

Figure 14:
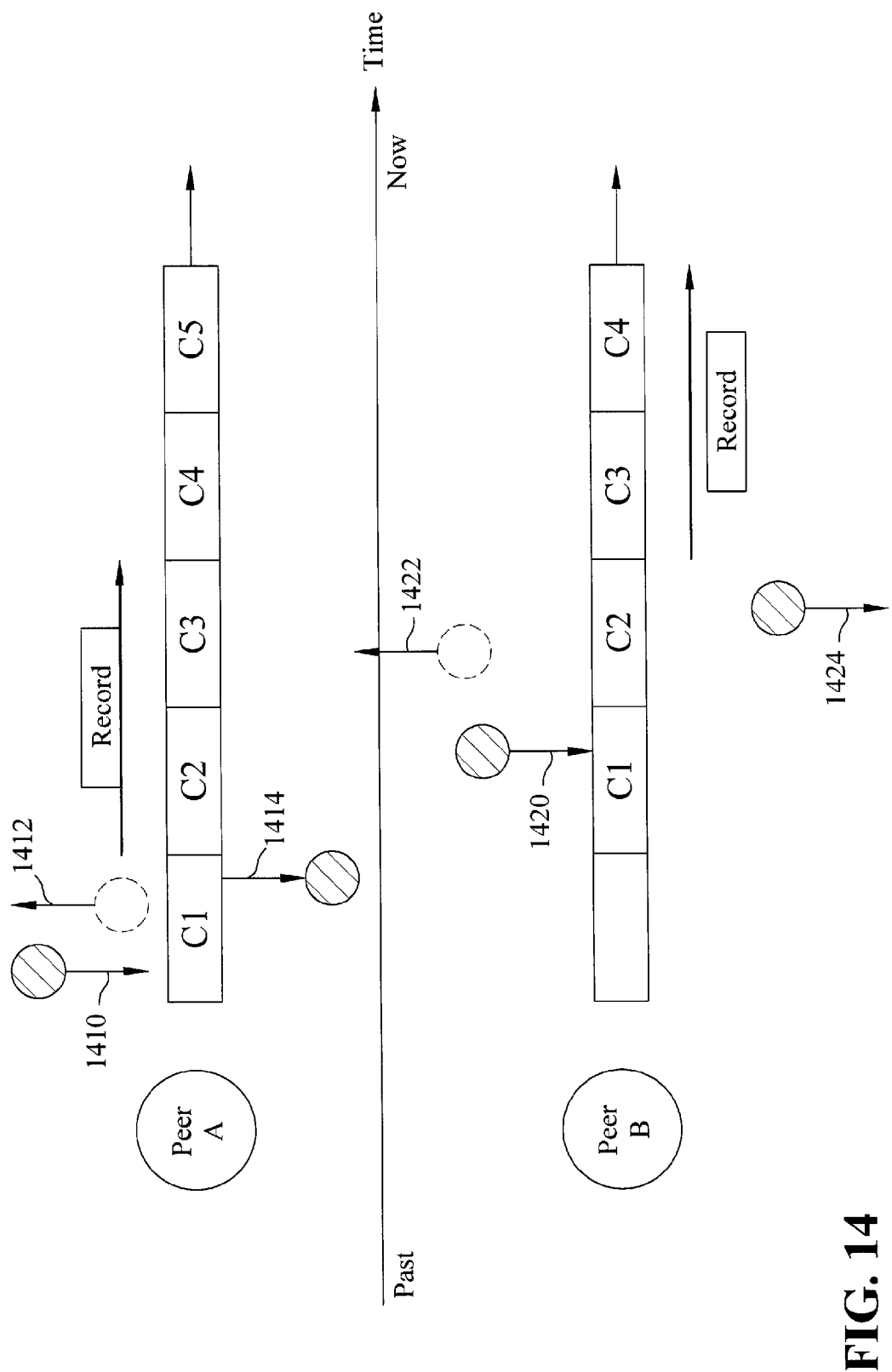
FIG. 14 shows an exemplary schematic view illustrating a normal scenario of token management, consistent with certain disclosed embodiments.
Figure 15:
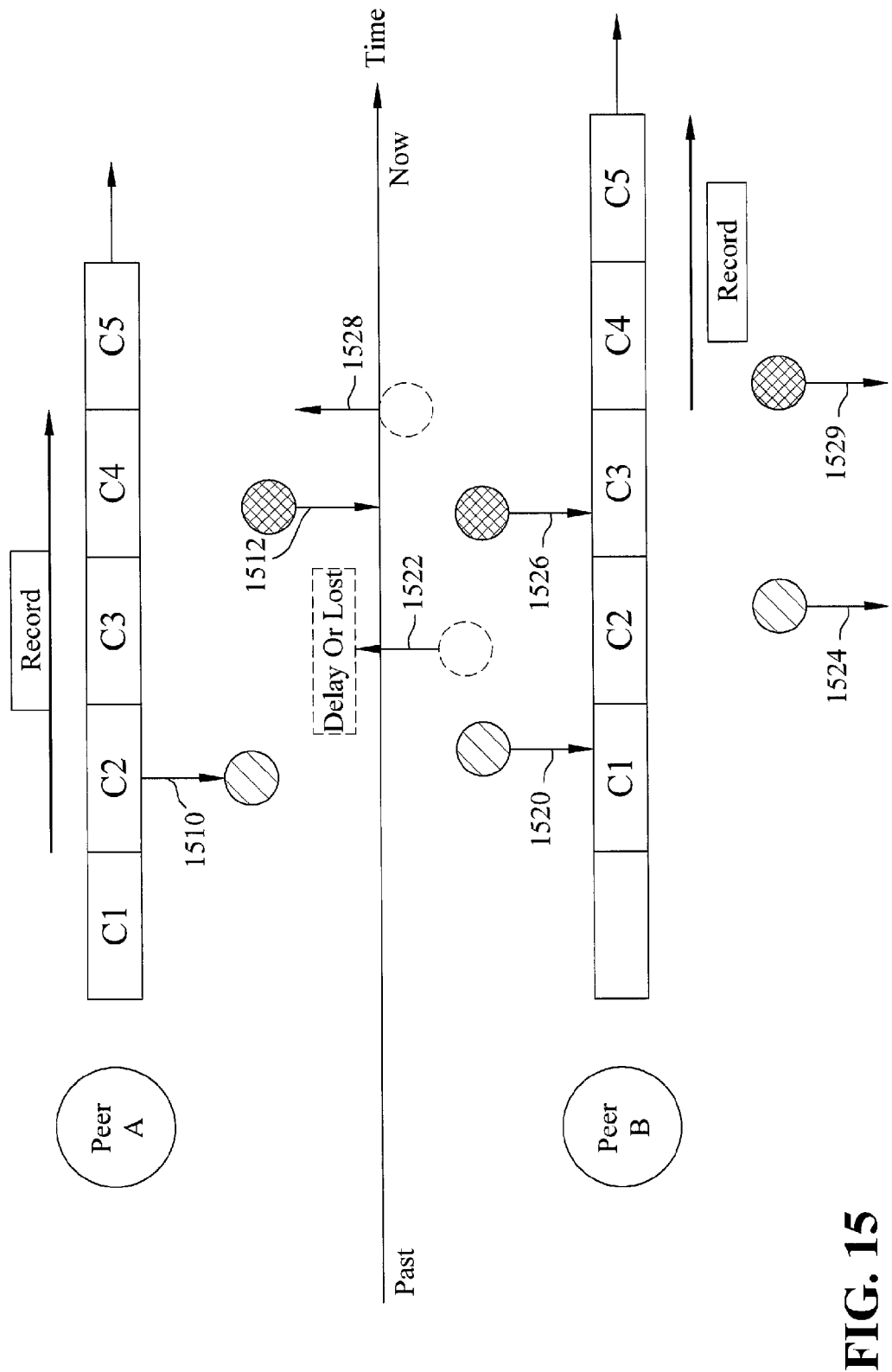
FIG. 15 shows an exemplary schematic view illustrating a reply ACK delay/lost scenario of token management, consistent with certain disclosed embodiments.
Figure 16:
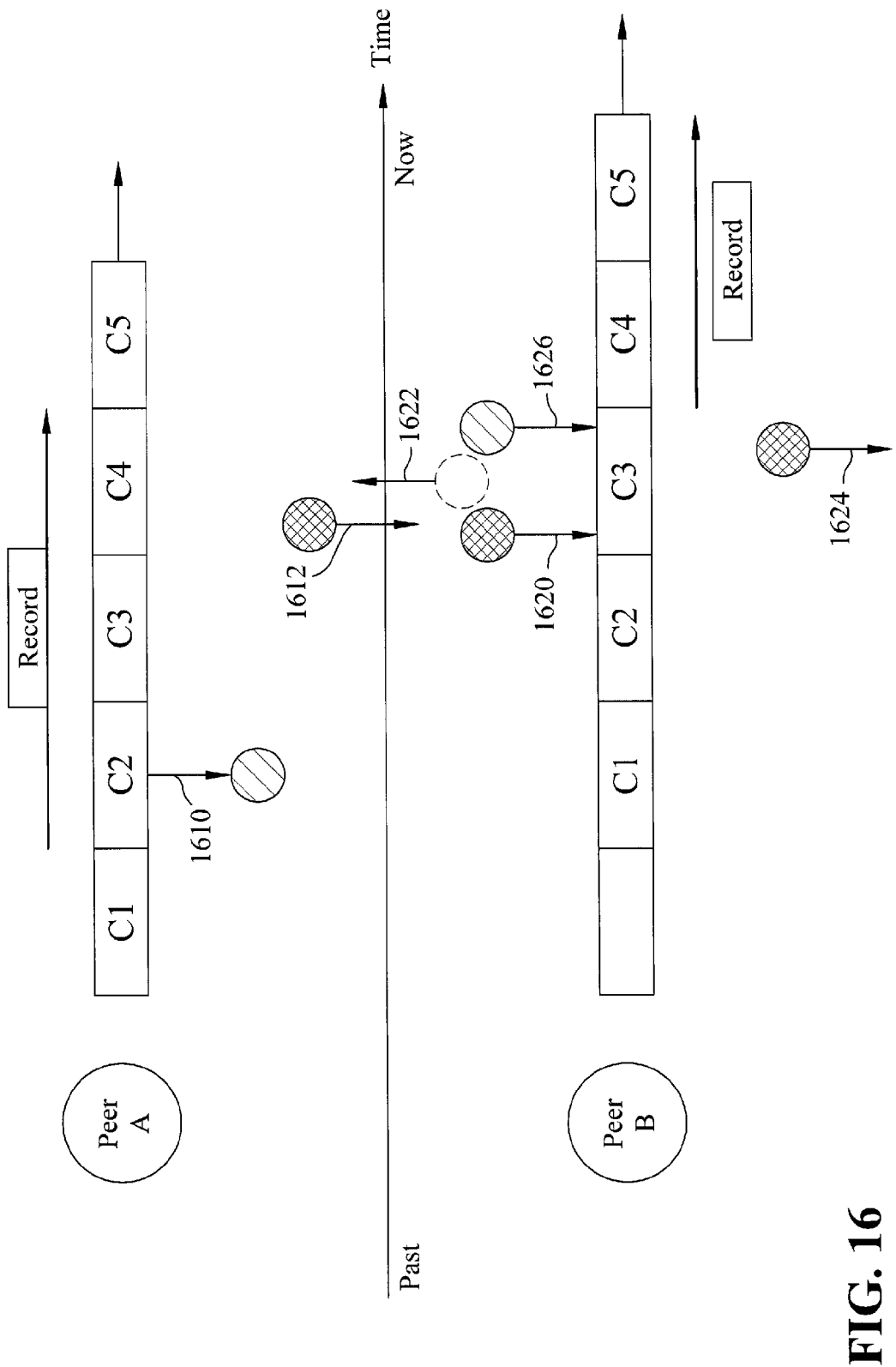
FIG. 16 shows an exemplary schematic view illustrating a token delay/lost scenario of token management, consistent with certain disclosed embodiments.

FIG. 14, FIG. 15 and FIG. 16 show respectively three scenarios of token managements, including, normal, reply ACK delay/lost, and token delay/lost, consistent with certain disclosed embodiments, wherein the circle indicates the token, the circles with the same pattern indicate the same token, and dashed circles indicate reply ACK token.

As shown in the normal scenario of FIG. 14, peer A receives token in time slot C1 (marked as 1410), and replies ACK token (marked as 1412) to the predecessor node, and then propagates the token (marked as 1414) to successor node B. Then, peer A records video stream content during time slots C2 and C3. Peer B receives token in time slot C1 (marked as 1420), and replies ACK token to the predecessor node A during time slot C2 (marked as 1422), and then propagates the token to successor node (marked as 1424). Then, peer B records video stream content during time slots C3 and C4.

FIG. 15 shows a scenario of reply ACK delay/lost. Peer A propagates the token to successor node B during time slot C2 (marked as 1510). Peer B receives the token during time slot C1 (marked as 1520), but delays/loses a reply ACK token to predecessor node A (marked as 1522), and propagates the token to successor node (marked as 1524). As aforementioned, when the time on the timer of peer A is reached, peer A re-creates another token during time slot C4, and then propagates to successor node B (marked as 1512). In other words, if the reply ACK is delayed or lost, the time on the timer of predecessor node A will be reached to indicate a delay or lost event has occurred. Then, predecessor node A will re-create the token and re-propagate the token.

Then, peer B receives token in time slot C3 (marked as 1526) again, and replies ACK token to the predecessor node A during time slot C3 (marked as 1528), and then propagates the token to successor node (marked as 1529). Then, peer B records video stream content during time slots C4 and C5. Also, peer A prolongs the time slot of recording video stream content to time slot C4.

FIG. 16 shows a scenario of token delay/lost. Peer A propagates the token to successor node B during time slot C2 (marked as 1610), but peer B does not receive the token during time slots C1 and C2. As aforementioned, when the time on the timer of peer A is reached, peer A re-creates another token during time slot C4, and then propagates to successor node B (marked as 1612). In other words, if the reply ACK is delayed or lost, the time on the timer of predecessor node A will be reached to indicate a delay or lost event has occurred. Then, predecessor node A will re-create the token and re-propagate the token. If peer B receives a plurality of repeated tokens within a period, peer B will delete the repetition to control the token growth to avoid too many tokens propagating.

Then, peer B receives token in time slot C3 (marked as 1620) again, and replies ACK token to the predecessor node A during time slot C3 (marked as 1622), and then propagates the token to successor node (marked as 1624). If peer B receives the delayed token in the same time slot C3 again (marked as 1626), peer B treats the delayed token as repetition and recycles the token. Then, peer B records video stream content during time slots C4 and C5. Also, peer A prolongs the time slot of recording video stream content to time slot C4.

As seen in FIG. 14, FIG. 15 and FIG. 16, regardless of the scenario the token management is in, the token management may all issues a plurality of tokens to repeat recording the same data to reduce the possibility of lost video stream chunks. Furthermore, in one disclosed embodiment, token management may also manage the creation and suppression of a plurality of tokens. On one hand, this technology may enhance the reliability of the live streaming service; and on the other hand, the technology also optimizes the buffer usage of each peer for recording video stream content.

Figure 17:
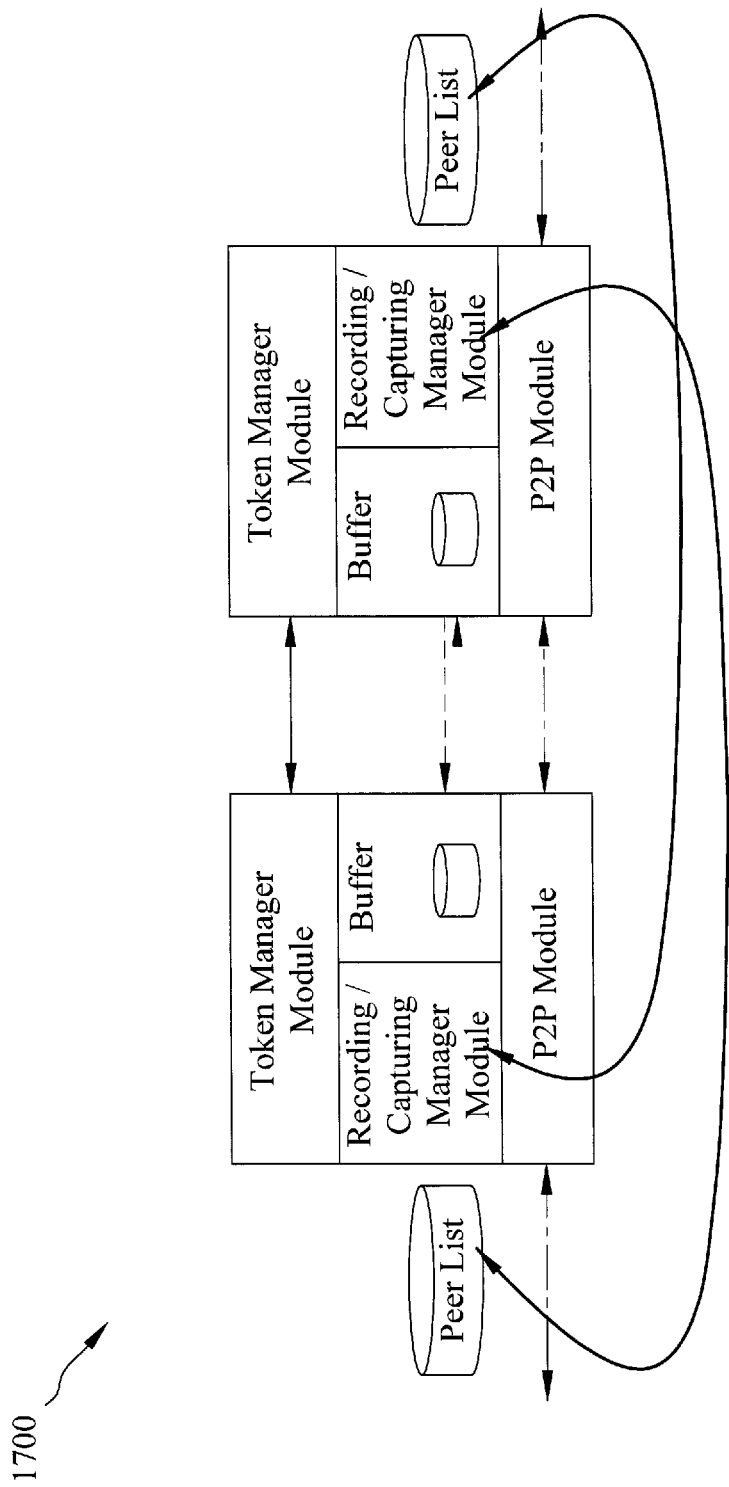
FIG. 17 shows an exemplary schematic view of an application of the P2P live streaming system, consistent with certain disclosed embodiments.

The aforementioned descriptions of each state of the finite state machine, flow of token propagation, and the operation of each module of P2P live stream system 500 all explain the circulation of the token among the peers of a peer topology network. In other words, the disclosed embodiments may adopt distributed management for token or video stream data storage. FIG. 17 shows an exemplary schematic view of an application of the P2P live streaming system, consistent with certain disclosed embodiments.

The exemplary application in FIG. 17 shows a live personal video recording (PVR) system 1700. In PVR system 1700, each peer includes the same token manager module to offer the same management technology to the token. Each peer has own buffer, such as, RAM, or soft/hard disk, to store video stream content. When a peer is recording or capturing, the information of the stored video stream content will be published to a peer list, or the peer address information storing the video stream content can be obtained from a peer list. The peer list may be stored in a RAM, soft/hard disk, or other storage device. ALL the peers of PVR system 1700 form a P2P network.

In other words, PVR system 1700 includes built-in storage media (buffer for storing video stream content) and uses token distribution management. Each program forms a P2P network, and each peer owns a token manager module and a P2P module. When a viewer intends to view a live stream at a time point, the viewer must join the P2P network, and then uses the time point as a key value to obtain the peer address information owning the data of that time point from the P2P network to download the stream data of the time slot from the peer. In this manner, the viewer may freely arrange the viewing schedule. Live PVR system 1700 may further includes a file management module to establish the user preference based on the past viewing record or to record automatically based on the preference of the user.

Figure 18:
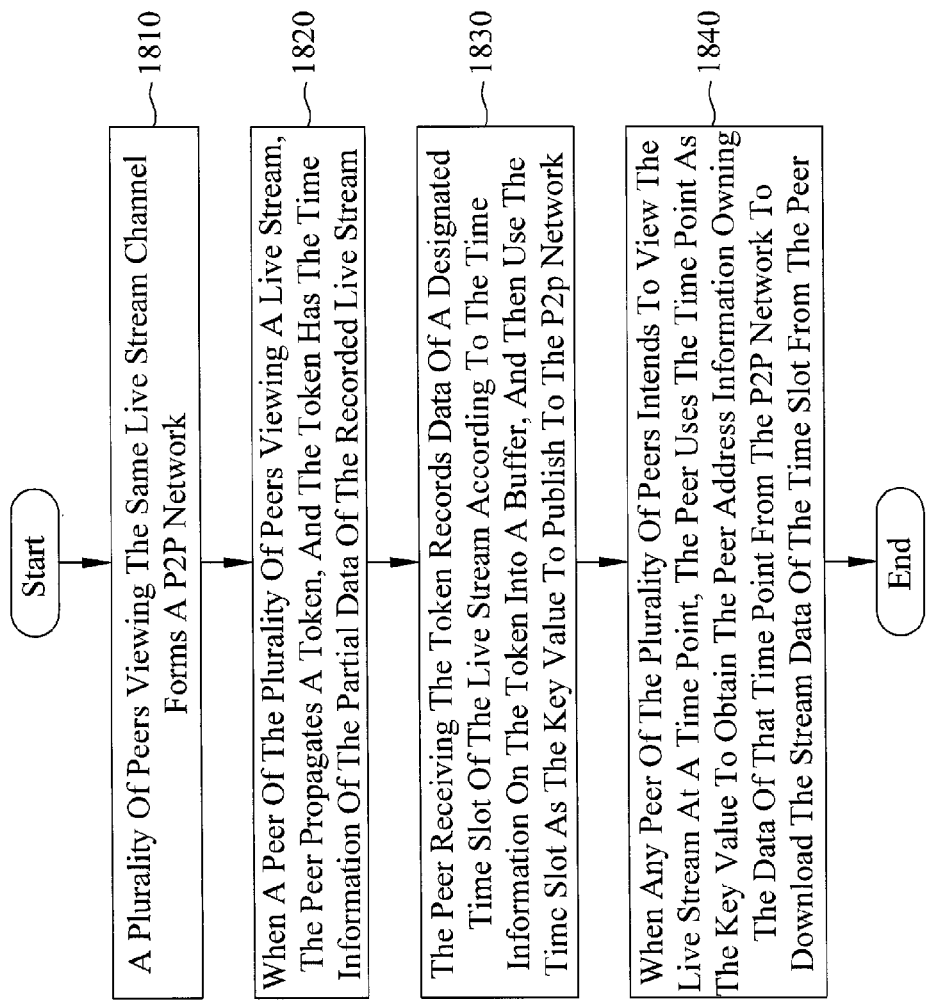
FIG. 18 shows an exemplary schematic view of a flowchart illustrating a method for P2P live streaming, consistent with certain disclosed embodiments.

FIG. 18 shows an exemplary schematic view of a flowchart illustrating a method for P2P live streaming, consistent with certain disclosed embodiments. In FIG. 18, a P2P network is formed by a plurality of peers viewing the same live stream channel, as shown in step 1810. When one peer of the plurality of peers views a live stream, the peer propagates a token, and the token has the time information of the partial data of the recorded live stream, as shown in step 1820. The peer receiving the token records data of a designated time slot of the live stream according to the time information on the token into a buffer, and then uses the time slot as the key value to publish to the P2P network, as shown in step 1830. When any peer of the plurality of peers intends to view the live stream at a time point, the peer uses the time point as the key value to obtain the peer address information owning the data of that time point from the P2P network to download the stream data of the time slot from the peer, as shown in step 1840.

In step 1810, the plurality of peers uses the same hash function to join the same live stream channel to form a DHT-network, and each peer has a predecessor node and a successor node. In step 1820, during the token delivery path, the peer propagating the token and the peer receiving the token use a handshake protocol, as shown in FIG. 3. Each peer uses the same distributed management technology to manage the token, at least including, addition, deletion and failure recovery of token, as described earlier. The three token management scenarios, i.e., normal, rely ACK delay/lost and token delay/lost, are as the exemplars shown in FIG. 14, FIG. 15 and FIG. 16.

In step 1830, the management of the buffer is shown as the exemplar in FIG. 4, and the flow of recording video stream content is as the exemplar in FIG. 8. The exemplar in FIG. 9 shows how to publish stream data in P2P network, by using a mapping of distributed hash table, in combination with an algorithm, to select a recording peer. The propagating peer has already published the information of the stored video stream data to the recording peer. Then, the recording peer will record the peer publishing the related information and the start time and end time of the recorded stream data content to a peer list. How to obtain the peer information from the peer list is as exemplar in FIG. 10, and the description is omitted here.

In summary, the disclosed mechanism for recording live stream content is based on a P2P network topology. One disclosed embodiment shows that a plurality of peers viewing the same live stream channel forms a P2P network for live stream sharing and providing live stream playback. The P2P live stream technology may support different types of devices or systems, including PC, server, mobile device, PDA, PVR, and so on.

Although the present disclosure has been described with reference to the disclosed exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the application as defined in the appended claims.

What is claimed is:

1. A peer-to-peer (P2P) live streaming system, applicable to a P2P network, said P2P network having a content provider and a plurality of peers viewing a same live stream channel, each of said plurality of peers having said system, and said system comprising:
    a token manager module for managing at least a token;
    a P2P module for handling P2P messages among said plurality of peers and maintaining the structure of said P2P network; and
    a recording manager module for publishing information of recorded video stream content via said P2P module to said P2P network; and
    managing a buffer of said peer and for recording video stream content to said buffer according to command of said token manager module;
    wherein said token manager module notifies said recording manager module to publish information of recorded video stream content and to record stream data.

2. The system as claimed in claim 1, wherein the size of said buffer corresponding to each of said plurality of peers is adjustable.

3. The system as claimed in claim 1, wherein when said buffer corresponding to each of said plurality of peers is full, old data in said buffer is updated by new recording of video stream content.

4. The system as claimed in claim 1, wherein each of said plurality of peers adopts said token manager module and uses the same manner to manage said token, at least including addition, deletion and failure recovery processing of tokens.

5. The system as claimed in claim 1, wherein said token manager module uses time unit as a unit to divide said buffer corresponding to each of said plurality of peers into a plurality of chunks for recording video stream data, and uses token propagation to regulate which peers of said plurality of peers must record which chunks of partial video stream content of said divided plurality of chunks.

6. The system as claimed in claim 1, wherein said token manager module uses a finite state machine to describe a processing flow of said plurality of peers propagating said at least a token.

7. The system as claimed in claim 1, wherein each of said plurality of peers has a corresponding predecessor node and a successor node, and each of said least a token propagated by said plurality of peers includes information of a start time and an end time of recorded live stream partial data of said predecessor of a peer.

8. The system as claimed in claim 5, wherein in said buffer, each of said plurality of chunks already recorded with video stream partial data has a chunk header for storing channel information and time information of recorded video stream content.

9. The system as claimed in claim 8, wherein said recording manager module uses said channel information and time information in said chunk header as a key value to determine via a distributed hash table which peer stores a peer list of video stream data of said chunk.

10. The system as claimed in claim 9, wherein said peer list at least includes start time and end time of the recorded video stream data stored in said chunk, and information of a corresponding peer index of said recording manager module.

* * * * *